INVENTOR.
KARL J. KALLENBERG
BY
Carwell, Legaad & Hicks
ATTORNEYS

INVENTOR.
KARL J. KALLENBERG
BY
Caswell, Legaard & Wicks
ATTORNEYS

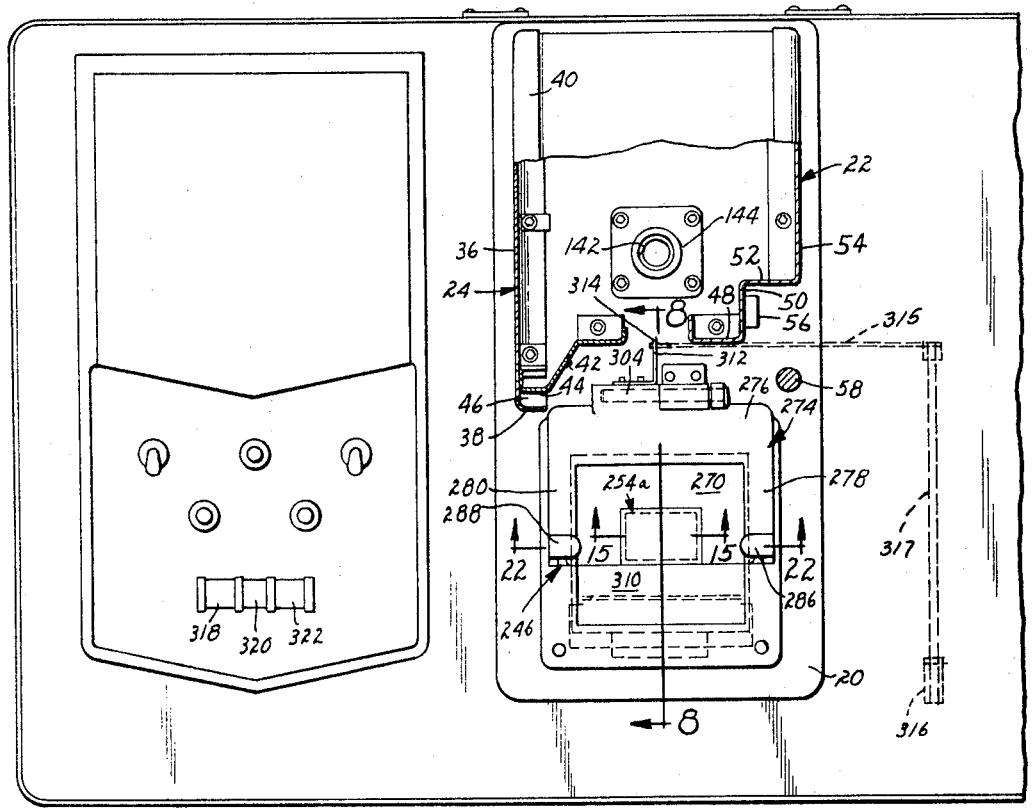

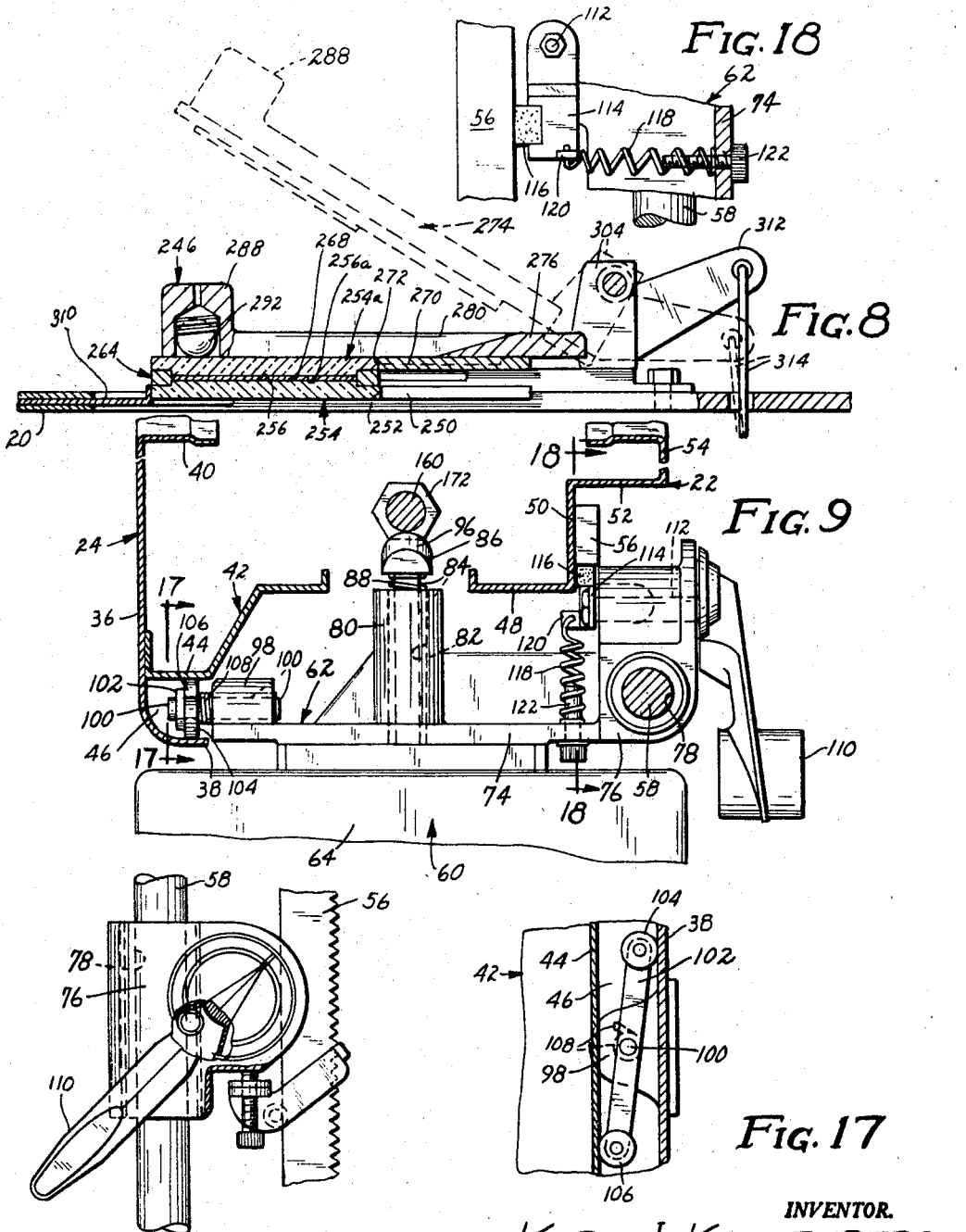

Aug. 20, 1968   K. J. KALLENBERG   3,397,613
TRANSPARENCY HOLDER FOR PHOTOGRAPHIC PRINTER
Original Filed April 16, 1962   9 Sheets-Sheet 8

INVENTOR.
KARL J. KALLENBERG
BY
Caswell, Lagaard & Wicks
ATTORNEYS

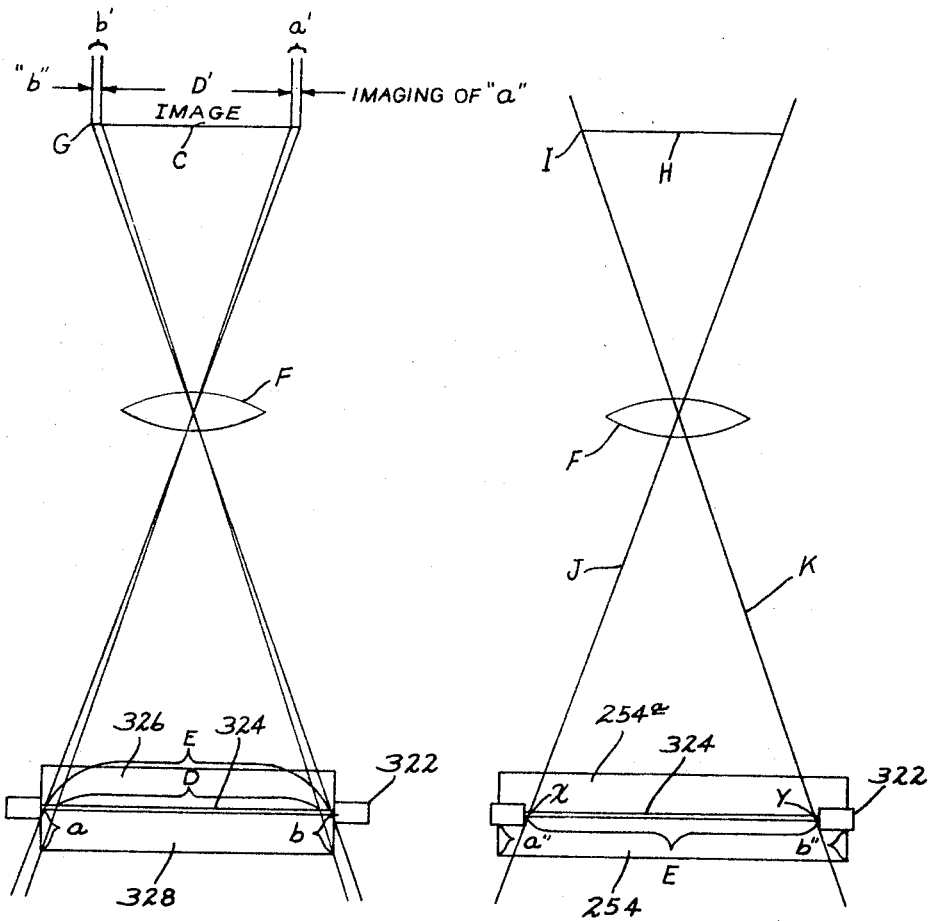

United States Patent Office 3,397,613
Patented Aug. 20, 1968

3,397,613
TRANSPARENCY HOLDER FOR
PHOTOGRAPHIC PRINTER
Karl J. Kallenberg, Minneapolis, Minn., assignor to
Pako Corporation, Minneapolis, Minn.
Original application Apr. 16, 1962, Ser. No. 189,663, now
Patent No. 3,228,284, dated Jan. 11, 1966. Divided and
this application Aug. 3, 1965, Ser. No. 476,813
2 Claims. (Cl. 88—24)

ABSTRACT OF THE DISCLOSURE

A device for supporting a single photographic transparency mounted in a frame and includes a transparent lower mount formed of a base portion having a table portion extending upwardly from the base portion. The table portion has a flat upper surface of an area less than that of the base portion which forms a peripheral recess on the lower mount. Further included is an upper mount substantially identical to the lower mount with the flat surface of the table portion of each mount being slightly less than the area of the transparency bounded by the frame together with means for positioning the upper mount upon the lower mount in juxtaposition to hold the transparency between the table portions independent of the frame.

---

This is a divisional application of application Ser. No. 189,663 filed Apr. 16, 1962 now U.S. Patent No. 3,228,-284, issued Jan. 11, 1966.

The invention relates broadly to an improvement in photographic equipment and more particularly to a printer for making a negative from what is commonly known as a "transparency" which is a positive image and also for making a duplicate of a "transparency." Specifically the invention relates to a holder for a "transparency" which will maintain the "transparency" in a single plane, it being well known that most, if not all, "transparencies" are bowed or warped slightly, and any unevenness of the transparency directly affects the focusing therefrom.

It is an object of the invention to provide a holder for the "transparency" independent of any means which the "transparency" may be mounted in. It is a further object to provide a holder for a "transparency" which allows use of the entire area of the transparency which is exposed relative to the transparency mount frame.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 5 is a plan view on the line 5—5 of FIGURE 1.

FIGURE 6 is a perspective view of the fixture column having the adjustable stop members for positioning the film deck and the objective lens.

FIGURE 8 is a sectional view on the line 8—8 of FIGURE 5.

FIGURE 9 is a sectional view on the lines 9—9 of FIGURES 3 and 4.

FIGURE 10 is a side view of a portion of the unit on the line 10—10 of FIGURE 1.

FIGURE 11 is a top plan view of the film deck with the negative film magazine removed and on the line 11—11 of FIGURE 1.

FIGURE 15 is a sectional view of a portion of the transparency mount on the line 15—15 of FIGURE 5.

FIGURE 16 is a perspective view of the lower half portion of the transparency holder, the upper half portion being identical but inverted and in juxtaposition to the lower half.

FIGURE 17 is a view on the line 17—17 of FIGURE 9.

FIGURE 18 is a view on the line 18—18 of FIGURE 9.

FIGURE 19 is a perspective view of the index wheel removed from the printer.

FIGURE 20 is a view on the line 20—20 of FIGURE 4.

FIGURE 21 is a perspective view of a conventional photographic transparency.

FIGURE 23 is a diagrammatic view illustrating a form of support for a transparency.

FIGURE 24 is a diagrammatic view illustrating the form of support for a transparency embodying the invention.

Figure 1:
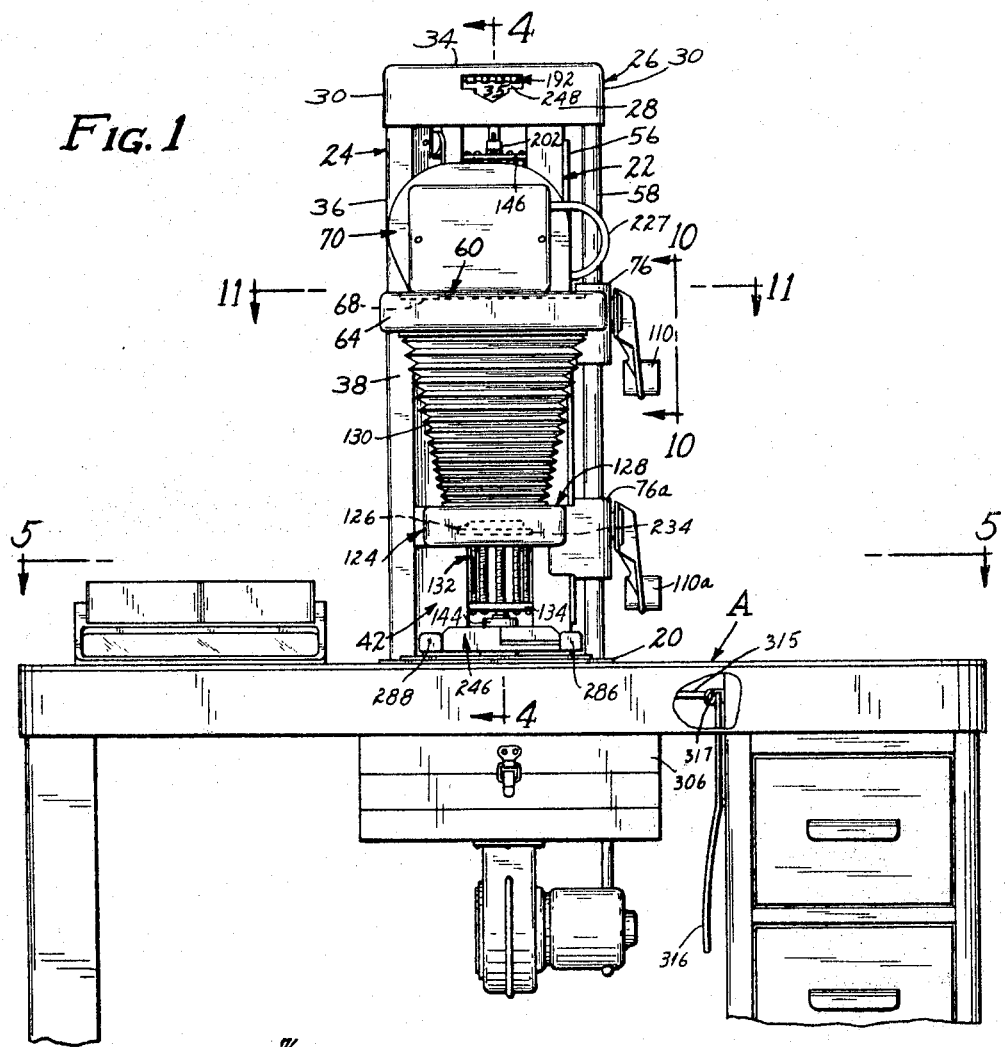
FIGURE 1 is a front elevational view of the printer mounted on a desk-like support.

Referring to the drawings in detail, and FIGURES 1, 3, 4, 5, 8, 15, 16, 21, 22, 23 and 24 in particular, the printer unit A includes the base plate 20, and secured to the base 20 is the upright support column 22 and the upright support column 24 spaced therefrom. The upper ends of the support columns 22 and 24 are secured in spaced relation by means of the upper cap member 26 including the front wall 28, the side walls 30, the rear wall 32 and the top 34. The support column 24 includes the vertical side wall portion 36 which terminates in the short front wall portion 38 and the short rear wall portion 40. Secured to the inner surface of the wall portion 36 is the internal wall 42 including the front portion 44 which is spaced from the short front wall portion 38 of column 24 to form the vertical channel 46, particularly in FIGURES 4 and 9.

The support column 22 includes the front vertical portion 48, the inner side wall portion 40, the inner rear wall portion 52 and the vertical side wall portion 54. Mounted on the outer surface of the inner side wall portion 50 of column 22 is the upright elongated flat brake bar 56 the function of which is hereinafter set forth.

Further provided is the upright cylindrical post 58 secured at its lower end to the base 20 and at its upper end to the cap member 26 thereby spacing the post from the brake bar 56.

The numeral 60 designates a film deck, FIGURE 11, which is secured to the upper carriage member 62. The film deck 60 includes the housing 64 the upper surface of which is formed with the recess 66 which receives the base plate 68 of the film magazine 70. At the bottom of the recess 66 is formed the film aperture 72 over which the film of the film magazine is positioned for exposure. The upper carriage 62, particularly FIGURES 4 and 9, includes the front bar portion 74 to which the film deck 60 is secured and formed on one end of the bar 74 is the enlarged portion 76 having the bore 78 through which the post 58 is slidably extended. The upper carriage 62 further includes the central boss 80 which extends inwardly from the front bar portion 74 and which is formed with the bore 82. Slidably mounted in the bore 82 is the shaft 84 and mounted on the end thereof is the latch 86. The latch 86 is normally urged outwardly of the boss 80 by means of the coil spring 88 interposed between the latch 86 and the outer end of the ball bushing 90. The shaft portion 84 mounting the latch 86 is restricted in its reciprocating movement by means of the notch 92 formed therein which engages with the pin 94 extending up through the boss 80. The latch 86 has formed on the outer free end thereof the oblique surface 96 which is also arcuately formed. The function of the latch will be hereinafter set forth.

Formed on one end of the bar portion 74 of the upper carriage 62 is the small boss 98 in which is rotatably mounted the shaft 100, particularly FIGURES 9 and 17. Secured to the outer end of the shaft 100 is the stabilizer bar 102 and rotatably mounted on the upper end of the bar 102 is the small wheel 104. Rotatably mounted on the lower end of the bar 102 is the small wheel 106. The bar is urged to the position shown particularly in FIGURE 17 by means of the coil spring 108 mounted on the shaft 100 and connected to the bar and the shaft thereby urging the wheel 104 against the short front wall portion 38 and the wheel 106 against the wall portion 38 whereby the shaft 100 is yieldably held centrally of the channel 46 and as a result the carriage 62 is held with a stabilizing influence as the same is moved up or down.

The carriage 62 also includes the brake release and lift handle 110 connected to the outer end of shaft 112 rotatably mounted in the enlarged portion 76 of the carriage 62, particularly FIGURES 9 and 18. Secured to the inner end of the shaft 112 is the brake lever 114 and mounted on the lever 114 is the resilient brake shoe 116 which is urged into contact with the brake bar 56 by means of the coil spring 118 connected at one end to the ear portion 120 of the lever 114 and mounted at the outer end on the pin 122 secured to the bar portion 74 of the carriage 62. With the shoe 116 in constant pressure engagement with the brake bar 56, the film deck 60 cannot fall quickly if the latch 96 is disengaged from a stop and the lever 110 released. The stop is hereinafter described. The brake shoe 116 may be released from and brought into contact with the bar 56 by lifting the brake release and lift handle 110.

Figure 25:
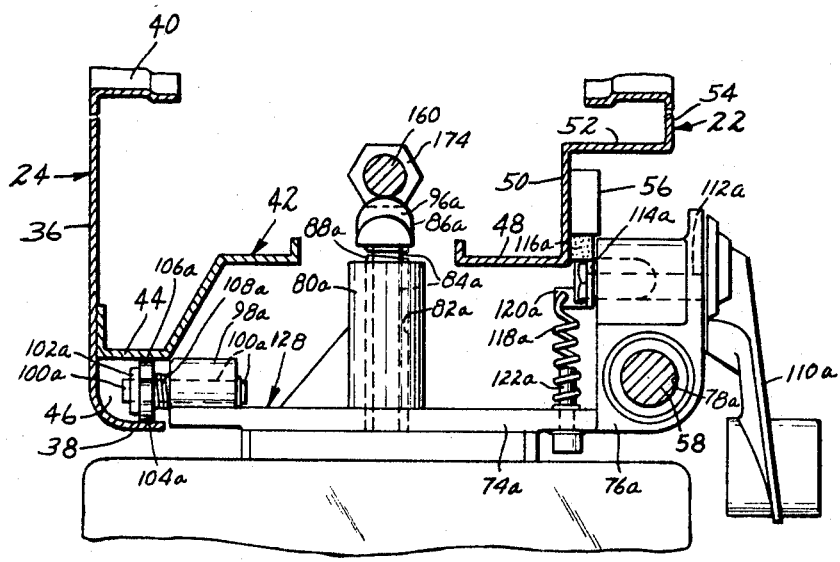
FIGURE 25 is a sectional view on the line 25—25 of FIGURE 4, showing the lens deck carriage in the manner in which the film deck carriage is shown in FIGURE 9, the two carriages being identical.

Further provided is the lens deck 124 which mounts the objective lens 126, and the lens deck is secured to the lower carriage 128 which carriage is substantially identical to the upper carriage 62, see particularly FIGURES 9 and 25. The parts of the lower carriage which are identical are given the same reference numeral but accompanied by the letter a. The bar 102a maintains the shaft 100a centrally of the channel 46 and as a result the carriage 128 is held with a stabilizing influence as it is moved up and down. The film deck 60 and the lens deck 124 are connected by the conventional bellows 130.

The numeral 132 designates a rotatable focus fixture, particularly FIGURES 1, 2, 4 and 6, which includes the circular lower support plate 134 having the stub shaft 136 depending therefrom, and mounted on the shaft 136 is the bearing 138 held in place by the clip 140. The bearing 138 mounts in the recess 142 of the fixture support 144 secured to the base 20 and allows the fixture to rotate. The mounting of the fixture 132 in the bearing allows precise, undisturbed and fixed positioning of the fixture. The focus fixture 132 also includes the circular upper support plate 146 and mounted on the top of the plate 146 is the flat key 148 formed with the notch 150. Further included in the fixture 132 are a multiplicity of rods, 152, 154, 156, 158, 160, 162, 164, 166, 168 and 170, ten in the instant case. The fixture rods are secured at the lower ends, in equal spaced relation, to the lower support plate 134 adjacent the periphery thereof. The upper ends of the fixture rods are secured to the underside of the upper support plate 146 in equal spaced relation adjacent the periphery thereof. The fixture rods are each threaded substantially throughout the length thereof although threads are not necessary throughout the entire length as will be seen subsequently. However, with threads substantially throughout the lentgh of the rods the same may be interchangeably used.

Threadedly mounted on each of the fixture rods for adjustability is a pair of upper and lower stops 172 and 174 respectively. Each stop 172 and 174 is equipped with a lock nut 176 whereby any given stop may be secured in the desired position. The upper stops 172 are used for coaction with the upper latch 86 of the film deck 60 and the lower stops 174 are used for coaction with the lower latch 86a of the lens deck 124 as will be set out in detail hereinafter.

As heretofore mentioned there are ten rods in the given fixture 132, one rod with a lens deck stop 172 and a film deck stop 174 necessary for each of the present day ten transparency sizes, namely, 35 mm. stereo, 828, ½—127, 127, square 127, ½—120, 120, square 120 and 4 x 5. Additional rods may be added for additional sizes of transparencies. Also, there are currently three different size films for use in the film magazine 70, namely, 35 mm., 120, and 127. Therefore for such present day films three fixtures such as 132 are needed, one for each of the three sizes of film, each fixture with ten rods and each rod with a pair of stops. Additional fixtures may be added for additional film sizes used. The function of the fixture as to focusing will be set forth hereinafter.

Figure 4:
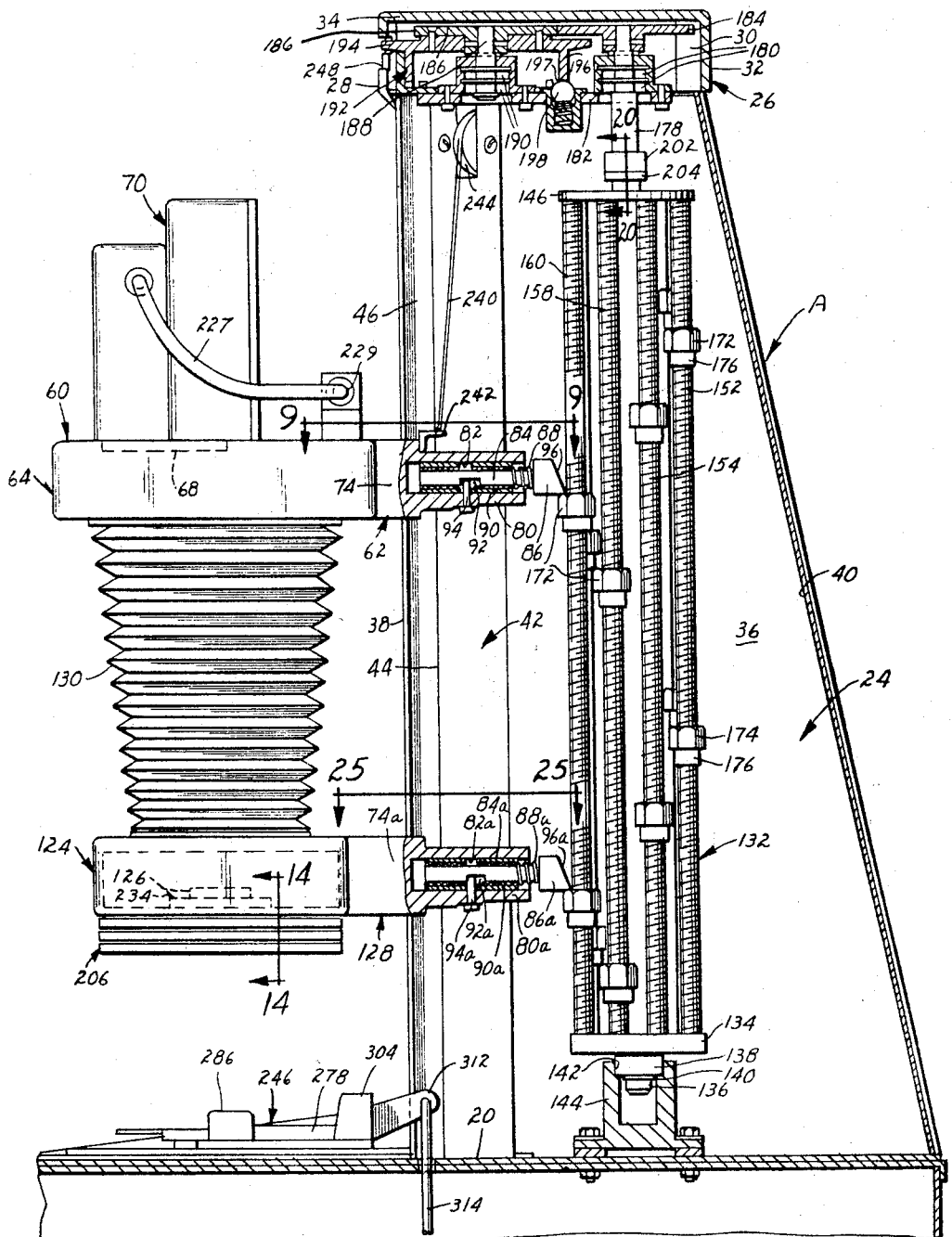
FIGURE 4 is an enlarged detailed sectional view on the line 4—4 of FIGURE 1.

With regard to the mechanism for supporting the upper end of and rotating the fixture 132, particularly FIGURE 4, a vertical shaft 178 is provided which is rotatably mounted in bearings 180 secured to plate 182 mounted on and within the cap member 26. The upper end of the shaft 178 is secured to the driven gear 184. Further provided is the driving gear 186 mounted on the shaft 188 which is rotatably mounted in bearings 190 secured to the plate 182. The gear 186 engages with the driven gear 184.

Secured to the underside of the driving gear 186 and rotatable on the same axis is the index wheel 192. The index wheel 192 includes the circular top plate 194 and the depending annular wall 196. The lower edge of the wall 196 is formed with a series of ten spaced indents 197 which receive the spring urged ball 198 mounted on the plate 182, FIGURE 4. The wall 196 carries the index markings such as 35, 127 etc., which correspond with the size of the transparency used, FIGURES 1 and 19. When the spring urged ball 198 is in an indent 197 the index wheel is held in position against rotation. Rotation of the index wheel 192 rotates the fixture 132 to position a predetermined pair of stops 172 and 174 opposite the latches 86 and 86a, for a given size transparency and film.

The key 148 mounted on the upper plate 146 of the focusing fixture 132 is inserted into the slot 200 formed in the shaft 178, FIGURE 20, and then the collar 202 slidably mounted on the shaft 178 is slipped down upon the shaft 178 and over the key 148 to a point where the lower edge of the collar 202 rests upon the stop shoulder 204 of the shaft 178, FIGURES 4 and 20. As a result the fixture 132 may be rotated by means of the shaft 178 through the gears 184 and 186 by means of the index wheel 192. The fixture is easily removed from the printer A by lifting the collar 202 so that the key 148 may be removed from the slot 200.

Figure 12:
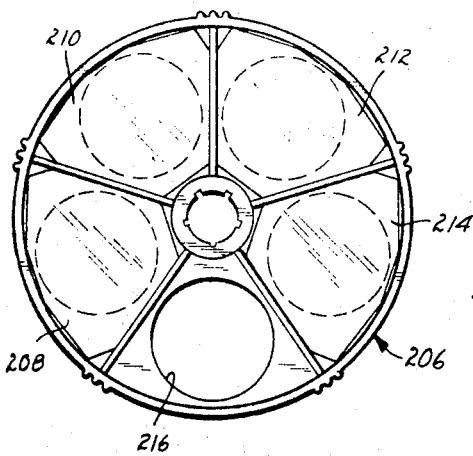
FIGURE 12 is a bottom plan view of a circular multiple neutral density filter mount on the line 12—12 of FIGURE 14.
Figure 13:
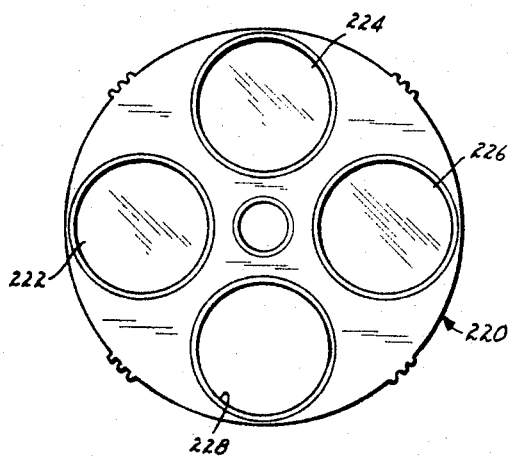
FIGURE 13 is a plan view of the multiple color correction filter mount.
Figure 14:
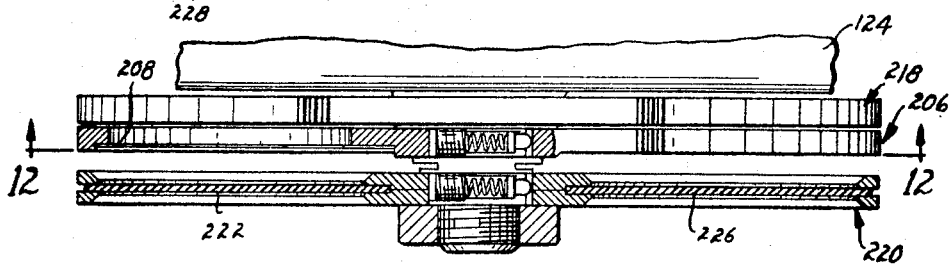
FIGURE 14 is a sectional view through the neutral density and color correction filters and mount therefrom on the line 14—14 of FIGURE 4.

Rotatably mounted on the underside of the objective lens housing 124 is the neutral density multiple filter holder 206, FIGURES 12 and 14, mounting the filters 208, 210, 212 and 214 and having the opening 216 which is used for obtaining maximum light. A second neutral density filter holder 218 is provided which is identical to holder 206 except for the valve of the filters thereon and which may be combined with the filters of the holder 206 to produce various densities. Rotatably positioned below the neutral density filter holder is the multiple color correction filter holder 220, FIGURES 13 and 14, mounting the color correction filters 222, 224 and 226, and having the opening 228 which is used for obtaining maximum light.

Figure 7:
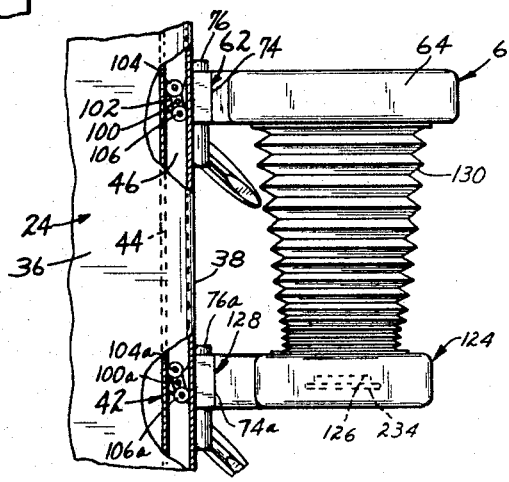
FIGURE 7 is a side elevational of the stabilizing means for the carriages mounting the film deck and the objective lens, portions of which are broken away.
Figure 2:
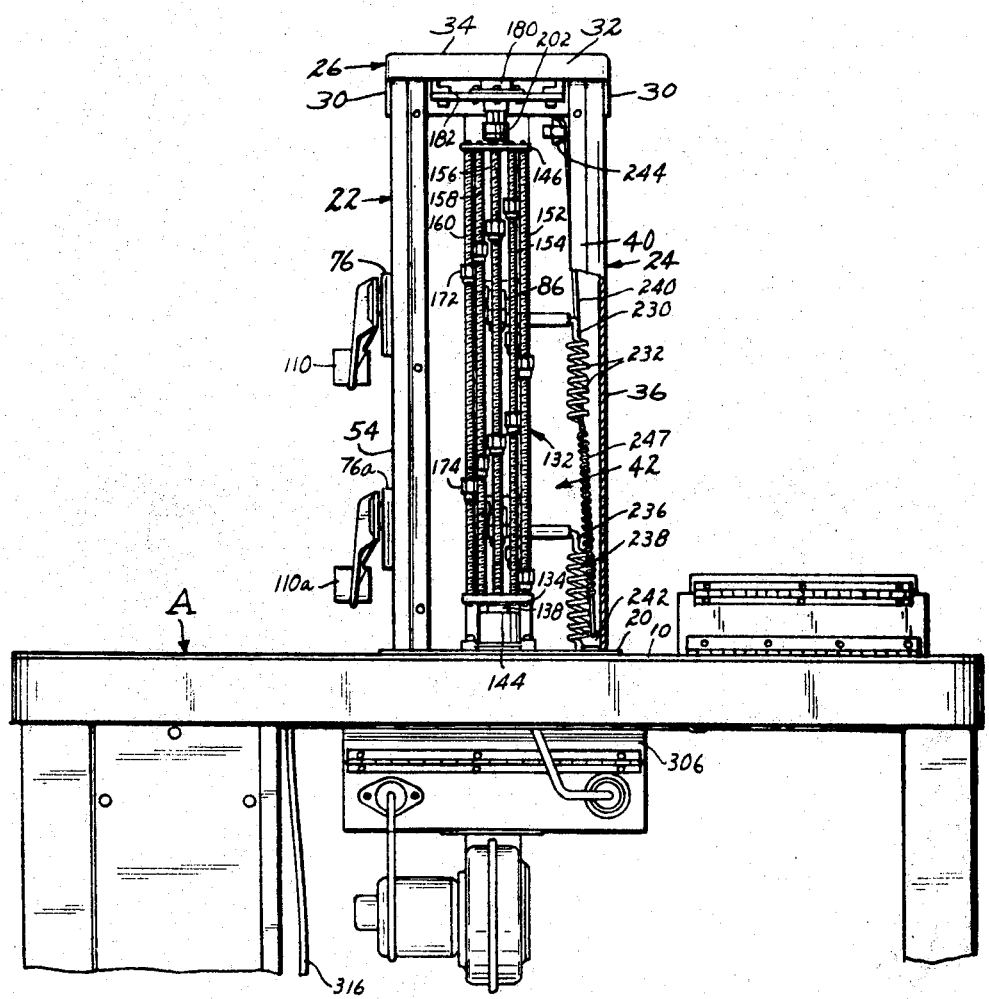
FIGURE 2 is a rear elevational view, some portions shown in section, other portions being broken away.
Figure 3:
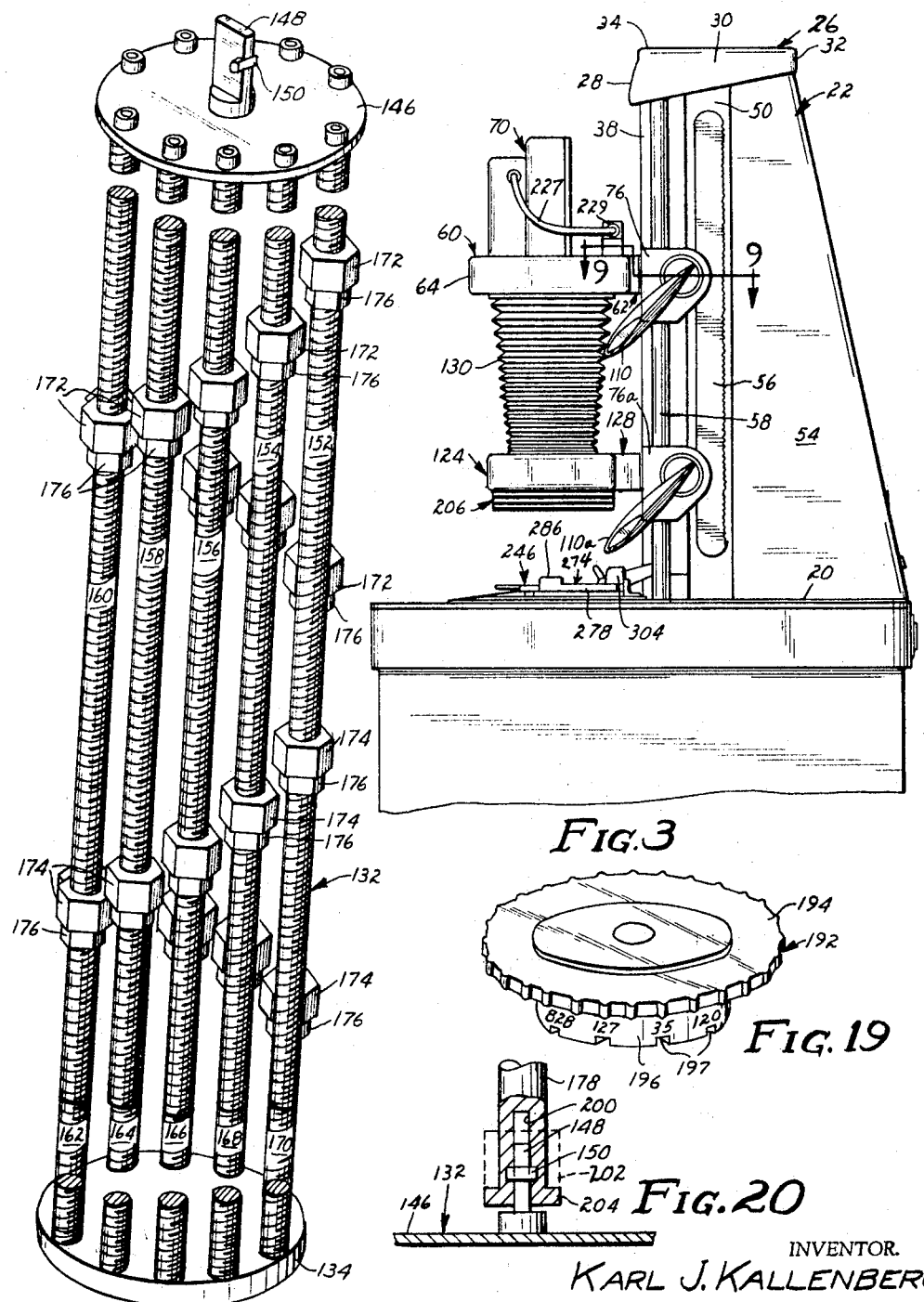
FIGURE 3 is a side elevational view of the printer.

The conventional film magazine 70 mounted on the film deck 60 is powered by the line 227 connected to the connector 229 which in turn is connected to line 230, FIGURE 2, carried by the deck 60 from a source of electrical power not shown. This line 230 is formed with a series of convolutions 232 which allows the line 230 to expand and contract as the film deck is raised or lowered. A conventional shutter 234 is mounted in the objective lens housing 124 below the lens 126 and is actuated by a solenoid not shown, FIGURES 1 and 7. Power for actuating the solenoid which actuates the shutter 234 is derived from the line 236 carried by the lens deck 124, and the line 236 is formed with a series of convolutions 238 whereby the line 236 is taut at all times as the lens deck is moved up or down. The line 236 derives power from a source not shown.

The film deck 60 and the carriage 62 therefore are balanced against freely dropping too quickly by means of a light cable wire member 240 connected at one end to the bracket 242 on the carriage 62 and passed over the sheave 244 and connected at the opposite end to the light spring 247 which is connected to the base 20, particularly FIGURES 4 and 2.

Referring again to the focusing fixture 132, such a fixture is needed for each size film which may be used in the film magazine 70, namely, 35 mm., 120 and 127, and as stated each fixture has ten rods, each rod with an upper stop 172 for the film deck latch 86 and a lower stop for the lens deck latch 86a. A separate rod is required in each fixture for each of the ten sizes of transparencies that can be worked from at the holder 246 hereinafter described.

Let it be supposed that the transparency from which the negative is to be made is a 35 mm. which is placed in the transparency holder 246. In addition, let it be supposed that the film used in the film magazine for making the negative is 120 film. A preset fixture 132 for 120 film is mounted in the holder 144. The index wheel 192 is then rotated to rotate the fixture until "35" appears at the front opening 248 on the cap 26 for a 35 mm. transparency is used in the holder 246. This places the proper rod of the fixture having the proper lens deck stop 172 at the position for engagement by the film deck latch 86, and at the same time the lens deck stop 174 on the same rod is placed for engagement by the lens deck latch 86a. Next the brake release handle 110 is moved until the film deck latch 86 engages upon the stop 172 of the rod moved into position by the index wheel 192 as heretofore mentioned.

If the latch 86 happens to be below the proper stop 172 presented and the latch must therefore be raised, the stop is easily bypassed as the oblique face of the latch strikes the stop and moves from the stop due to the spring 88. When the fixture 132 is rotated, a stop which interferes with a latch 86 or 86a will be bypassed due to the laterally formed arcuate surface of the latch. After the stop is bypassed by the latch 86 and is above the stop, it is easily lowered so that the latch 86 engages upon the stop. Engagement of the latch 86a of the lens deck 124 with the proper stop 174 is accomplished in the same manner as with latch 86. With the film deck and the lens deck in place, the unit is ready to print upon the film from the transparency.

It will be seen that with the fixture stop and latch coaction construction a relationship may be set up between a transparency size selected from various sizes, a given film size, and focus relative to both, and such relationship can be easily and quickly attained by actuating the brake release and lift handles 110 and 110a until the latches 86 and 86a are each engaged upon a predetermined stop.

The procedure for positioning one set of upper and lower stops 172 and 174 on the fixture 132 is as follows: Let it be supposed that a 35 mm. transparency is positioned in the holder 246 and 120 film will be used in the magazine 70. First the magnification is determined by dividing the projected image size at the film deck by the size of the transparency. The transparency-to-lens distance and the lens-to-the-image distance (at film deck) are calculated by the following formulas: The formulas for transparency to lens is $$\left(\frac{l}{m}\pm1\right)F$$

and the remaining formula for lens to film plane is $$(M\pm1)F$$

A compensating factor is used to account for the thickness of glass in the upper half of the transparency holder interposed between the transparency and the objective lens. With the use of the above formulas and the compensating factor we have the approximated positions of the stops 172 and 174 which determine the film deck and lens deck positions with respect to the transparency. Next a resolution target, for example, having 80 lines per millimeter is placed between the upper and lower half portions of the transparency holder 246, hereinafter described.

The film magazine includes an aperture plate upon which the film magazine rests. The distance between the outer surface of the aperture plate and the film plane is critically controlled. For purposes of focusing the printer A, the film magazine is removed and replaced by a microscope prefocused to a plane which corresponds to the film plane of the magazine. The projected image of the resolution target is observed through the scope. Then the lens deck stop 174 and the film deck stop 172 are adjusted until the projected image is in sharp focus. The stops 172 and 174 are locked in position by means of a lock nut 176. This focusing procedure is applicable to the setting of each pair of stops 172 and 174 on each of the ten rods of each of the three above-mentioned fixtures.

In the example given above a 35 mm. transparency was used in the holder 246 and the printing of the negative was on 120 film in the film magazine 70. If a negative is desired on 35 mm. film, the film magazine 70 is supplied with 35 mm. film, and a fixture preset for 35 mm. film is mounted on support 144. The index wheel 192 is rotated so that the 35 mm. indicator appears in the opening 248 of the cap 26. The movement of the index wheel 192 positions the correct rod and stops 172 and 174 of the 35 mm. fixture for positioning the lens deck 124 and the film deck 60 to produce a 35 mm. negative or film from the 35 mm. transparency in the holder 246.

As heretofore stated a transparency used in the holder 246 is rarely perfectly flat and is warped slightly in one direction or the other. The plane of the transparency must be held in a single plane so that correct focusing may be obtained. In addition, it is desired to print all of the area of the transparency up to the edge of the frame which mounts the transparency. To this end the following transparency holder has been devised. A lower plate 250 is provided which is formed with the opening 252, particularly FIGURES 8, 15, and 22. Secured in the opening is the lower transparency mount support 254 which is made of transparent material such as glass. The lower mount 254 is formed from a single piece of glass having a cut or recess formed on the periphery of the upper surface thereby producing the raised table portion 256 with the shoulder edge 258 and the peripheral surface 260.

The area of the table portion 256 is just slightly less than the size of the opening 262 of the conventional transparency mount 264, and the vertical dimension or thickness of the shoulder 258 is slightly greater than the thickness of the mount 264 at 266, FIGURE 15, that is the thickness of that portion of the mount 264 between the outer face surface thereof and the outer face surface of the actual transparency 268. Thus, the transparency 264 positions neatly upon the table portion 256 of the mount support 254 with the lower surface of the transparency flat upon the flat surface of the table portion 256 of the mount support 254 with the frame of the mount 264 partially within the recess formed by the shoulder 258 and supporting surface 260, particularly FIGURE 15. The lower surface of the mount 264 does not contact the peripheral surface 260. In other words, the transparency is supported solely on the flat table portion 256 of the mount support 254 and thus independent of the frame mount 264.

Figure 22:
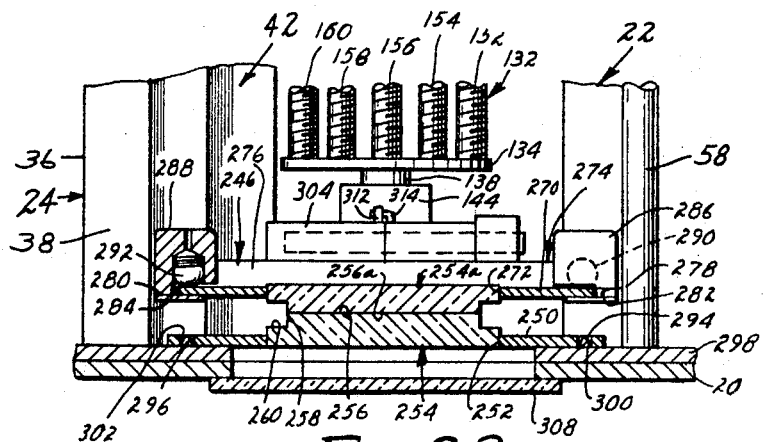
FIGURE 22 is a sectional view on the line 22—22 of FIGURE 5.

Further provided is the upper plate 270 which is formed with an opening 272, particularly FIGURES 15 and 22, and secured in said opening is the upper transparency mount support 254a which is identical to mount support 254 but which is reversed and in juxtaposition to the mount support 254. The flat surface of the table portion 256a of mount support 254a rests upon the upper flat surface of the transparency 268 placed between supports 254 and 254a and presses it flat upon the table 256 of mount support 254, thus maintaining the transparency in a single positive and predetermined plane, FIGURES 15 and 22, independent of the frame mount 264. With the printer A shown, a pair of plates 250 and 270 having different size supports 254 and 254a is provided for each of the ten sizes of transparencies herein mentioned.

Further provided is the upper plate holder 274 which includes the base portion 276 and extending from the base 276 are the spaced arms 278 and 280, particularly FIGURES 22 and 5. Formed on the underside of each of the arms 278 and 280 are the slots 282 and 284, respectively, which slideably receive and mount an upper plate 270. Formed on each of the arms 278 and 280 are the bosses 286 and 288, respectively, and mounted in each boss is the spring urged ball 290 and 292, respectively, the balls holding the upper plate 270 under slight pressure in position in the slots 282 and 284, FIGURE 22.

The lower plate 250 is correctly and removably positioned with respect to the upper plate 270 by means of the short pins 294 and 296 mounted on the frame 298 secured to the base 20, the pins 294 and 296 fitting into the holes 300 and 302, respectively, of the lower plate 250, FIGURE 22.

The upper plate holder 274 is hingedly mounted at the rear edge thereof on the base 20 by means of the hinge 304 connected to the holder 274 and the base 20. With such a hinging the upper plate 270 with its transparency mount support 254a may be swung upwardly and out of the way of the lower mount 254, FIGURE 8, whereby a transparency may be easily positioned on the lower mount 254 or removed therefrom. The upper plate 270 is easily lowered upon the lower plate 250 thereby positioning a transparency between the mount supports 254 and 254a.

The size of the plates 250 and 270 for the mount supports 254 and 254a vary in width due to the different size supports 254 and 254a for the various size transparencies heretofore mentioned, and light from light source in the box 306 which comes up through the glass plate 308 is cut off by means of the plate 310 slidably mounted in the base 20 and thus cut off from the operator's eyes. The plate 310 accommodates for the various widths of plates 250 and 270.

The holder 274 for the upper transparency mount is held in raised position by means of the arm 312 connected to a movable portion of the hinge 304. Connected to the arm 312 is the vertical rod 314 which in turn is connected to a horizontal rod 315 which is connected to a rod 317 connected to the knee-actuated lever 316, FIGURES 1 and 5.

Assuming that the transparency is in place in the holder 246, the film is in the magazine 70, and the film deck and lens deck have been placed in proper position as outlined heretofore, the operator then depresses one of the three initiating switches 318, 320 or 322 which brings the light source 306 to full brilliance and opens the shutter 234 by mechanism not shown. This projects the image of the transparency upon the film mounted in the film deck 60. The film is automatically transported one frame length ready for the next exposure by mechanism not shown. Each of the switches 318, 329 and 322 gives a different exposure time, by means of mechanism not shown, which in combination with neutral density filters controls the total exposure to the film in the magazine 70.

Referring again to the supporting of a transparency for printing thereon. The conventional means for mounting the transparency is to fix the same in a small frame, and in printing therefrom it is highly desirable to include as much of the transparency as possible for printing. The transparency should be included right up to the edge of the frame mount. With reference to FIGURE 23, the numeral 322 designates a conventional transparency mount with the actual transparency 324 held in a single plane by the upper and lower flat transparent blocks 326 and 328, respectively. While such blocks hold the transparency flat in a single plane for overall correct focus therefrom, it will be seen that the edges indicated as a and b of the lower block 328 are included in the image c at the edges as at a' and b' which are superimposed on this image of the transparency, the letter D representing the usable portion of the transparency.

It is, of course, highly desirable to include the entire extent of area of the transparency indicated as E. With the illustration in FIGURE 23, the magnification ratio would have to be changed by moving the lens F and film plane indicated as G and use only that portion of the transparency 324 indicated as D and produced as D'. To state it briefly, the transparency would have to be cropped to use a term of the trade. Such cropping is generally quite objectionable as all the subject matter of the transparency is not included.

To alleviate such a condition as above which necessitates cropping, reference is made to FIGURE 24 which shows the lower and upper mounts 254 and 254a, respectively, supporting the transparency 324. It will be seen that with the mounts 254 and 254a the edges a" and b" are not picked up and produced in the image H at the film plane I, for the edges a" and b" are not included in the marginal rays J and K which pass through the lens F to form the extent of the image H, said edges being offset from the extreme edges of the transparency as at X and Y. Thus, the entire transparency portion indicated as E may be projected at the film plane I by means of the mounts 254 and 254a as particularly shown in FIGURE 24.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a device for supporting a single transparency mounted in a frame for exposure therefrom, a transparent lower mount member including a base portion, a table portion extending upwardly from said base portion and having a flat upper surface of an area less than that of said base portion thereby forming a peripheral recess on said lower mount, an upper mount substantially identical to said lower mount, the flat surface of said table portion of each of said mount members being slightly less than the area of the transparency bounded by the frame, means for positioning said upper mount upon said lower mount in juxtapostion thereto with the table portion of each of said mounts oppositely disposed with the flat surface of each table portion contactable with the transparency to hold the transparency in a single plane therebetween with the frame thereof in the peripheral recess formed by the recess of each mount.

2. In a device for supporting a single transparency mounted in a frame for exposure therefrom a transparent first mount member having raised means formed with a flat surface for supporting the transparency independent of the frame, a transparent second mount member having raised means formed with a flat surface for holding the transparency upon said raised means of said first mount member in a single plane independent of the frame in which the transparency is mounted, the area of each of said flat surfaces being slightly less than the area of the transparency bounded by the frame, and means for moving together and separating said first and second mount members.

References Cited

UNITED STATES PATENTS 2,834,273    5/1958    Bartilotta _____ 88—24 X

FOREIGN PATENTS 1,013,893    8/1957    Germany.

NORTON ANSHER, *Primary Examiner.*

RICHARD A. WINTERCORN, *Assistant Examiner.*